United States Patent [19]

Routson

[11] Patent Number: 4,694,703
[45] Date of Patent: Sep. 22, 1987

[54] CIRCUMFERENTIALLY ORIENTED FLEXURE SUSPENSION

[75] Inventor: Gregory S. Routson, Kentwood, Mich.

[73] Assignee: Lear Siegler, Inc., Santa Monica, Calif.

[21] Appl. No.: 625,518

[22] Filed: Jun. 28, 1984

[51] Int. Cl.⁴ .............................................. G01C 19/02
[52] U.S. Cl. ...................................... 74/5 F; 403/291
[58] Field of Search .......................... 74/5 F; 308/2 A; 464/78, 100

[56] References Cited

U.S. PATENT DOCUMENTS

| Re. 30,290 | 6/1980 | Craig et al. | 74/5 F X |
|---|---|---|---|
| 3,515,006 | 6/1970 | Duck | 74/5 F |
| 3,543,301 | 11/1970 | Barnett | 74/5 F |
| 3,585,866 | 6/1971 | Ensinger | 74/5 F |
| 3,614,894 | 10/1971 | Ensinger | 74/5 F |
| 3,700,289 | 10/1972 | Bilinski et al. | 308/2 A |
| 3,700,290 | 10/1972 | Ensinger | 308/2 A |
| 3,811,172 | 5/1974 | Bilinski et al. | 29/445 |
| 4,062,600 | 12/1977 | Wyse | 308/2 A |
| 4,143,451 | 3/1979 | Craig et al. | 74/5 F X |
| 4,207,668 | 6/1980 | Poevite | 74/5 F X |
| 4,261,211 | 4/1981 | Haberland | 74/5 F |
| 4,269,072 | 5/1981 | Duncan | 74/5 F |
| 4,286,370 | 9/1981 | Craig | 74/5 F X |
| 4,297,904 | 11/1981 | Morton | 74/5 F |
| 4,380,108 | 4/1983 | Craig | 74/5 F X |
| 4,528,864 | 7/1985 | Craig | 74/5 F X |

FOREIGN PATENT DOCUMENTS

| 2626800 | 12/1977 | Fed. Rep. of Germany | 74/5 F |
| 2653427 | 6/1978 | Fed. Rep. of Germany | 74/5 F |

Primary Examiner—Leslie Braun
Assistant Examiner—Dwight G. Diehl
Attorney, Agent, or Firm—Varnum, Riddering, Schmidt & Howlett

[57] ABSTRACT

A two-axis, monolithic, flexure hinge suspension system for an accelerometer or gyroscope has first, second and third cylindrical portions which are slightly axially spaced from each other along a common axis and are connected by pairs of flexible hinges therebetween. Each pair of flexible hinges is mutually perpendicular to another pair of flexible hinges and is also perpendicular to the common axis. Each flexural hinge comprises a pair of flexure leaves extending between adjacent cylindrical portions and joined together at the crossing portions thereof. One of the leaves in the flexure extends downwardly from an arcuate wall of one of the cylindrical portions to an arcuate wall of another cylindrical portion at about a 55° angle to a vertically oriented common axis. The other leaf in the flexure extends upwardly from an arcuate wall portion in the one cylindrical portion to an arcuate wall in the other cylindrical portion at about a 55° angle to the vertically oriented common axis. The leaves are cylindrically mounted to the cylindrical portions such that one of the leaves is in tension and one of the leaves is in compression. The cylindrical mounting eliminates frequency sensitive changes in the flexure leaves which affect G-sensitivity drift of the inertially sensitive device.

10 Claims, 3 Drawing Figures

CIRCUMFERENTIALLY ORIENTED FLEXURE SUSPENSION

TECHNICAL FIELD

This invention relates to hinge suspension systems for inertially sensitive devices, such as accelerometers and gyroscopes. In one of its aspects, the invention relates to a hinge suspension for first, second and third axially aligned cylindrical portions wherein the flexure hinges are circumferentially mounted to eliminate frequency-sensitive changes in the flexure hinges which affect G-sensitivity drift.

BACKGROUND ART

In Craig, U.S. Pat. No. 4,286,370 (issued Sept. 1, 1981), there is disclosed a hinge suspension system for inertially sensitive devices made from a single cylindrical member having portions thereof removed by an electro-discharge cutting technique to separate the cylindrical member generally along parallel planes perpendicular to the cylindrical axis. The three cylindrical portions are joined together through two sets of a pair of diametrically opposite, monolithic flexure hinges. Each set of flexure hinges forms a flexure axis about which connecting cylindrical portions may rotate and which is perpendicular to the common axis of the three cylindrical portions. The flexure axes formed by the two sets of flexure hinges are mutually perpendicular. Each flexure hinge is formed by separate crossed leaves which extend between the cylindrical portion at an acute angle to the common axis of the three cylindrical portions. The leaves are mounted axially such that both leaves are in compression when the common axis is vertically positioned. This mounting can result in an isoelastic drift or frequency sensitivity of the flexure hinge which in turn may result in G-sensitivity drift of the resulting device. G-sensitivity must be corrected by electrical circuit or by software in a processor.

Haberland, in U.S. Pat. No. 4,261,211 (issued Apr. 14, 1981), discloses a monolithic hinge of the same type as in the Craig patent except that the leaves of the flexure hinge are joined together at central crossing portions thereof so that the flexure takes place about an axis passing through the crossed leaves. The hinge also has an axial mounting whereby the flexure has same G-sensitivity drift problems as the Craig device.

Barnett, in U.S. Pat. No. 3,543,301 (issued Nov. 24, 1970), discloses a flexural spring pivot of a disc type in which the flexures are formed between three concentric annular rings. The flexures are in the form of leaves which are mounted between adjacent rings.

DISCLOSURE OF INVENTION

According to the invention, a two-axis, monolithic, flexure hinge suspension system for an inertially sensitive device such as an accelerometer or a gyroscope has first, second and third cylindrical portions which are slightly axially spaced from each other along a common axis and are connected by pairs of flexure hinges therebetween. Each pair of flexure hinges is mutually perpendicular to another pair of flexure hinges and is also perpendicular to the common axis. Each flexure hinge comprises a pair of flexure leaves extending between adjacent cylindrical portions. The flexure leaves are circumferentially mounted to the cylindrical portions such that one of the leaves is in tension and one of the leaves is in compression when the cylindrical portions are subject to axial forces. The cylindrical mounting eliminates frequency-sensitive changes of the flexure leaves and thus minimizes G-sensitivity drift of the device.

A first pair of flexure hinges define a first flexure axis which is perpendicular to the common axis. A second pair of flexure hinges define a second flexure axis which is perpendicular to the common axis and also perpendicular to the first flexure axis. Each flexure axis and the common axis define a plane, the two planes thus defined by the respective flexure axes and the common axis being mutually perpendicular to each other.

The term "circumferential mounting" means that each flexure leaf in a pair of such flexure leaves has one end mounted to one cylindrical portion at one side of an associated one of the planes and an opposite end mounted to another cylindrical portion at another side of the associated plane.

Preferably, the leaves are joined together at crossing central portions thereof. The circumferential mounting is such that one of the leaves in a flexure extends downwardly from one of the cylindrical portions to another of the cylindrical portions at an acute angle to a plane associated with the respective flexure axis and the common axis. Another of the leaves in the flexure extends upwardly from the one cylindrical portion to the other cylindrical portion at an equal and opposite acute angle to the associated plane. To this end, a side wall forms a part of the flexure in each of the first, second and third cylindrical portion and leaves extend from the side walls. Preferably, the side walls are arcuate in configuration and the acute angle of the leaves with respect to the associated plane is about 55°.

BRIEF DESCRIPTION OF THE DRAWINGS

The invention will now be described with reference to the accompanying drawings in which.

BEST MODE FOR CARRYING OUT THE INVENTION

Figures 1, 2:
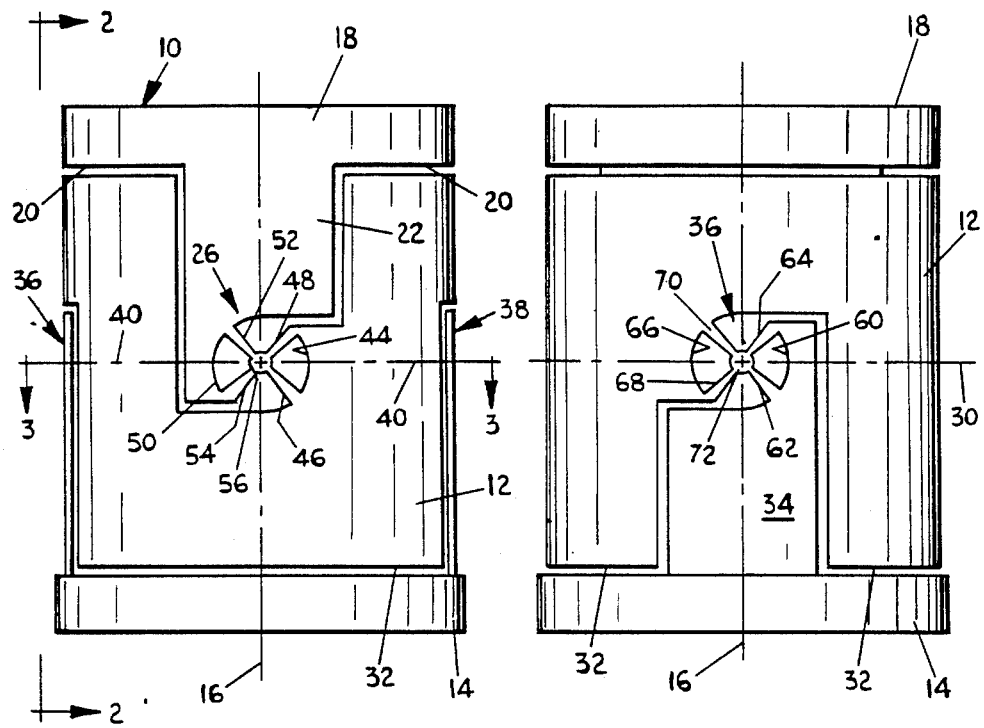
FIG. 1 is a side elevational view of a universal joint flexure assembly according to the invention.
FIG. 2 is a view of the joint flexure assembly shown in FIG. 1 and seen along lines 2—2 of FIG. 1.
Figure 3:
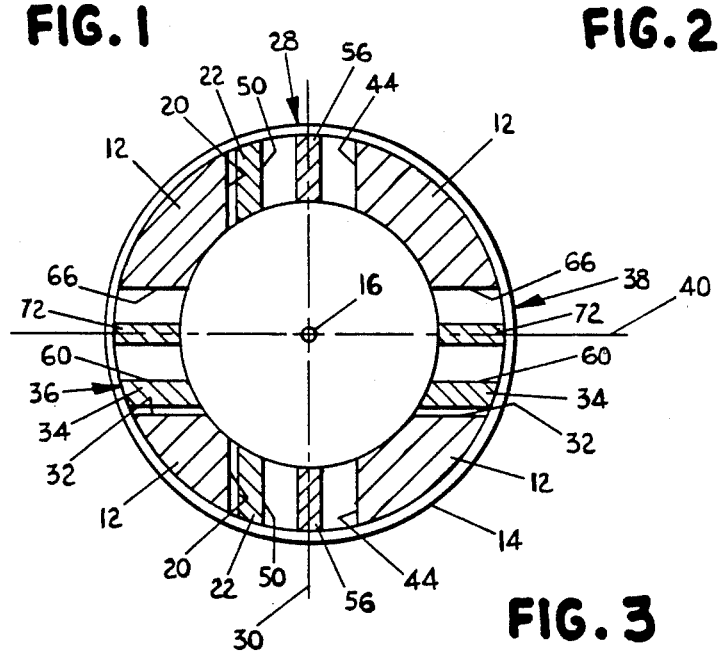
FIG. 3 is a sectional view seen along lines 3—3 of FIG. 1.

Referring now to the drawings, there is shown a flexure hinge suspension 10 having a shaft-connecting portion 18, a rotor-connecting portion 14 and a gimbal portion 12 therebetween. The gimbal portion 12, the shaft-connecting portion 18 and the rotor-connecting portion 14 are all generally cylindrical in shape and are aligned along a common axis 16. Typically, the flexure hinge suspension 10 is made from a solid cylindrical member and is cut by an electro-discharge machining apparatus in a well-known manner. Two L-shaped cuts 20 are provided between the shaft-connecting portion 18 and the gimbal portion 12, leaving a depending arm 22. Flexures 26 and 28 are provided between the gimbal portion 12 and the shaft-connecting portion 18 along a common flexure axis 30.

In like manner, L-shaped cuts 32 are provided between the gimbal portion 12 and the rotor-connecting portion 14, leaving upwardly directed arms 34 at diametrically opposed sides of the shaft-connecting portion 18. Flexures 36 and 38 are provided on opposite sides of the suspension 10 between the gimbal portion 12 and the rotor-connecting portion 14 along a common flexure axis 40.

The flexure axes 30 and 40 are perpendicular to each other and to the common axis 16. Thus, a first plane is defined by the flexure axis 30 and the common axis 16. This plane would be perpendicular to the plane of the drawing in FIG. 1 and include the common axis 16. Likewise, a second axis is formed by the flexure axis 40 and the common axis 16. This plane would be perpendicular to the plane of the drawing in FIG. 2 and including line 16. The first and second planes are thus mutually perpendicular to each other.

The flexures 26 and 28 are substantially identical to each other, with the flexure 28 being a mirror image of the flexure 26. For the sake of brevity, only flexture 26 will be described.

An arcuate connecting surface 44 is provided between the sides of the two L-shaped cuts 20. Integrally formed flexure leaves 46 and 48 extend radially from the arcuate connecting surface 44, with the flexure leaf 46 extending upwardly at a 35° angle to the horizontal and the flexure leaf 48 extending downwardly at a 45 angle to the horizontal. In like manner, an arcuate connecting surface 50 connects the edges of the L-shaped cuts 20 on the shaft-connecting portion 18. Integrally formed flexure leaves 52 and 54 extend radially from the arcuate connecting surface 50 and join or merge with the flexure leaves 46 and 48 at a central hub 56. The flexure leaf 52 extends downwardly at about a 35° angle to the horizontal (or at an angle of 55° to the first plane) whereas the flexure leaf 54 extends upwardly at about a 35° angle to the horizontal (or at an angle of 55° to the first plane). All of the flexure leaves 46, 48, 52 and 54 have a decreasing thickness from the respective arcuate connecting surfaces 44 and 50 to the central hub 56.

The flexures 36 and 38 are of an identical nature to the flexures 26 and 28. The flexure 36 is substantially identical to the flexure 38 except that it is a mirror image thereof. For the sake of brevity, only flexure 36 will be discussed.

The upward arm 34 on rotor-connecting portion 14 has arcuate surface 60. Integrally formed flexure leaves 62 and 64 extend radially from the arcuate surface 60, with the flexure leaf 62 extending upwardly at about a 35° angle to the horizontal (or at an angle of 55° to the second plane) and the flexure leaf 64 extending downwardly at about a 35° angle to the horizontal. Arcuate surface 66 is formed on the gimbal portion 12, diametrically opposed to the arcuate surface 66. Integrally formed flexure leaves 68 and 70 extend radially from the arcuate surface 66 and join the flexure leaves 62 and 64 at a central hub 72. As illustrated in the drawings, the flexure axis 40 passes through the central hub 72, the flexure axis 30 extends through the central hub 56 and the flexure axes 30 and 40 intersect at the common axis 16. Thus, the gimbal portion 12 is free to pivot with respect to the rotor-connecting portion 14 about the flexure axis 40 and is free to pivot with respect to the rotor-connecting portion 18 about the flexure axis 30. Thus, the flexure hinge suspension 10 provides for universal flexure of the shaft-connecting portion 18 with respect to the rotor-connecting portion 14.

The angular relationship between the common axis 16 and flexure leaves can vary depending on the nature of the flexure structure. It has been found that an angle of about 55° between the flexure leaves and the common axis 16 is appropriate in the configuration shown to minimize an isoelastic drift.

It will be appreciated from closer inspection of the flexures that the flexures are oriented in a circumferential direction as distinguished from an axial direction, i.e. parallel to common axis 16. In other words, the flexure connection between the rotor-connecting portion 14 and the gimbal portion 12, as well as the flexure connection between the shaft-connecting portion 18 and the gimbal portion 12, is circumferential rather than axial. For example, referring to FIG. 1 and to the flexure 26, the flexure leaves 46 and 48 which are secured to gimbal 12 extend from the side rather than the bottom, despite the fact that the gimbal 12 is positioned axially beneath the shaft-connecting portion 18. Thus, one end of the flexure leaves 46 and 48 is located on one side of the first plane and an opposite end of the flexure leaves 46 and 48 is located at an opposite side of the first plane. In like manner, the flexure leaves 52 and 54 extend from a side of the depending arm 22, despite the fact that the shaft-connecting portion 18 is axially above the gimbal portion 12. Mounting of the flexure in this manner provides for one of the leaves to be in tension and one of the leaves to be in compression in each pair of leaves projecting from one portion of the suspension when a force is applied along the common axis 16. Thus, leaves 48 and 54 will be in tension and leaves 52 and 46 will be in compression in the flexure 26 when a compressive force is applied along the common axis 16.

Likewise, in flexure 36, the leaves 64 and 68 will be in tension and leaves 70 and 62 will be in compression. This circumferential mounting for the flexure results in a fixed spring rate independent of acceleration or gravity and eliminates resonant-frequency G-sensitivity drift. G-sensitivity drift is experienced with conventional axially mounted flexures, such as illustrated in the Craig U.S. Pat. No. 4,286,370.

The invention is used in inertial instruments such as tuned rotor gyroscopes and accelerometers. An example of a tuned rotor gyroscope is illustrated in the Craig, U.S. Pat. No. 4,286,370, which is incorporated herein by reference. A machining technique for manufacturing the flexure hinge suspension is generally disclosed in the Craig patent. However, instead of cutting separate flexure leaves as in Craig, the flexure leaves are integral.

Reasonable variation and modification are possible within the scope of the foregoing disclosure and drawings without departing from the spirit of the invention which is set forth in the accompanying claims.

The embodiments of the invention in which an exclusive property or privilege is claimed are defined as follows:

1. In a two-axis, monolithic flexure, hinge suspension system for inertially sensitive devices wherein first, second and third cylindrical portions are slightly axially spaced from each other along a common axis and connected by pairs of flexure hinges therebetween, one pair of flexure hinges defining a first flexure axis which is perpendicular to the common axis, another pair of said flexure hinges defining a second flexure axis which is perpendicular to said common axis and to said first flexure axis, whereby said first flexure axis and said common axis lie in a first plane and said second flexure axis and said common axis lie in a second plane perpendicular to said first plane; each flexure hinge having a pair of flexure leaves extending between adjacent cylindrical portions, the improvement which comprises:

each said pair of flexure leaves being circumferentially mounted to adjacent cylindrical portions such that each flexure leaf in a pair of said flexure leaves has one end mounted to one cylindrical portion at one side of an associated one of said first and second planes, and an opposite end mounted to another cylindrical portion at another side of said one associated plane such that one of said leaves is in tension and one of said leaves is in compression when axial forces are applied to said cylindrical portions, whereby G-sensitivity drift resulting from resonant-frequency sensitivity changes of the flexure hinges is minimized.

2. A suspension system according to claim 1 wherein said leaves are joined together at crossing central portions thereof.

3. A suspension system according to claim 2 wherein one of said leaves in at least one of said flexures extends downwardly from one of said cylindrical portions to another of said cylindrical portions at an acute angle to an associated one of said first and second planes, and another of said leaves in said flexure extends upwardly from said one cylindrical portion to said another cylindrical portion at an equal and opposite acute angle to said one associated plane.

4. A suspension system according to claim 3 wherein each flexure hinge further comprises a side wall forming a part of a respective first, second or third cylindrical portion and said leaves extend from said side wall.

5. A suspension according to claim 4 wherein said side walls are arcuate in configuration.

6. A suspension system according to claim 1 wherein one of said leaves in at least one of said flexures extends downwardly from one of said cylindrical portions to another of said cylindrical portions at an acute angle to an associated one of said first and second planes, and another of said leaves in said flexure extends upwardly from said one cylindrical portion to said another cylindrical portion at an equal and opposite acute angle to said one associated plane.

7. A suspension system according to claim 6 wherein each flexure hinge further comprises a side wall forming a part of a respective first, second or third cylindrical portion and said leaves extend from said side wall.

8. A suspension system according to claim 7 wherein said side walls are arcuate in configuration.

9. A suspension system according to claim 1 wherein each of said flexure hinges further comprises a side wall forming a part of a respective first, second or third cylindrical portion, and said leaves extend from said side wall.

10. A suspension system according to claim 9 wherein said side walls are arcuate in configuration.

* * * * *